(12) United States Patent
Pasquet et al.

(10) Patent No.: US 9,458,827 B2
(45) Date of Patent: Oct. 4, 2016

(54) WIND TURBINE ROTOR AND METHOD OF ASSEMBLY THEREOF

(75) Inventors: Pierre Pasquet, Alella (ES); Santiago Canedo Pardo, Barcelona (ES); Marc Cavallé, Barcelona (ES)

(73) Assignee: ALSTOM RENOVABLES ESPAÑA, S.L., Barcelona (ES)

( * ) Notice: Subject to any disclaimer, the term of this patent is extended or adjusted under 35 U.S.C. 154(b) by 481 days.

(21) Appl. No.: 14/130,313

(22) PCT Filed: Jul. 12, 2012

(86) PCT No.: PCT/EP2012/063656
§ 371 (c)(1),
(2), (4) Date: Dec. 30, 2013

(87) PCT Pub. No.: WO2013/007778
PCT Pub. Date: Jan. 17, 2013

(65) Prior Publication Data
US 2014/0127018 A1    May 8, 2014

Related U.S. Application Data

(60) Provisional application No. 61/534,014, filed on Sep. 13, 2011.

(30) Foreign Application Priority Data

Jul. 13, 2011  (EP) .................................... 11382237

(51) Int. Cl.
*F03D 7/02*    (2006.01)

(52) U.S. Cl.
CPC ............. *F03D 7/0224* (2013.01); *F03D 80/70* (2016.05); *F05B 2260/30* (2013.01); *F05B 2260/79* (2013.01); *Y02E 10/722* (2013.01); *Y02E 10/723* (2013.01); *Y10T 29/49321* (2015.01)

(58) Field of Classification Search
CPC ..................................................... F03D 7/0224
See application file for complete search history.

(56) References Cited

FOREIGN PATENT DOCUMENTS

| DE | 10 2004 017323 |  | 11/2005 |  |
|----|----|----|----|----|
| DE | 102004017323 | A1 * | 11/2005 | ........... F03D 7/0224 |
| DE | 20 2005 014699 |  | 12/2005 |  |
| EP | 1 816 346 |  | 8/2007 |  |
| EP | 2 290 228 |  | 3/2011 |  |
| EP | 2 431 606 |  | 3/2012 |  |
| GB | 2 071 781 |  | 9/1981 |  |
| WO | WO 03/106839 |  | 12/2003 |  |

OTHER PUBLICATIONS

International Search Report for PCT/EP2012/063656, mailed Nov. 6, 2012, 11 pgs.

* cited by examiner

*Primary Examiner* — Richard Edgar
(74) *Attorney, Agent, or Firm* — Squire Patton Boggs (US) LLP

(57) ABSTRACT

Wind turbine rotor comprising a hub, a plurality of blades, at least one pitch system for rotating a blade substantially along its longitudinal axis and at least one pitch retention system, wherein a pitch retention system comprises a cam profile and a cam follower, and one of the hub and a blade comprises said cam profile and the other of the hub and blade comprises said cam follower, and wherein the cam follower comprises a pushing member and a contact member, wherein the pushing member is arranged to push the contact member towards the cam profile, and the cam profile comprises a local depression, and wherein the cam follower and cam profile are arranged such that when the blade is in a pitch position at or below nominal wind speed, the contact member can be retained in said local depression.

17 Claims, 6 Drawing Sheets

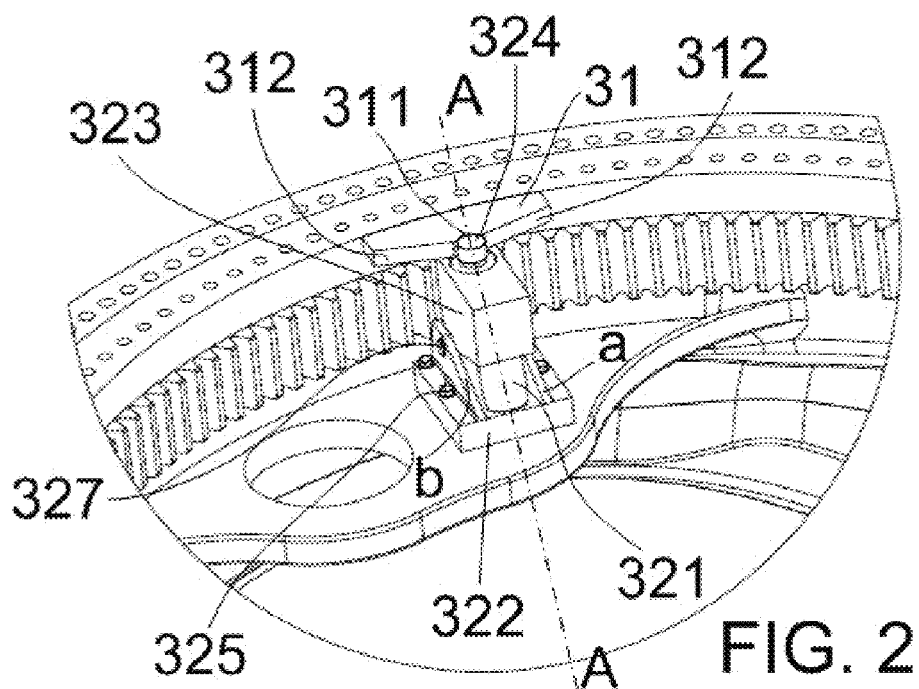
FIG. 2
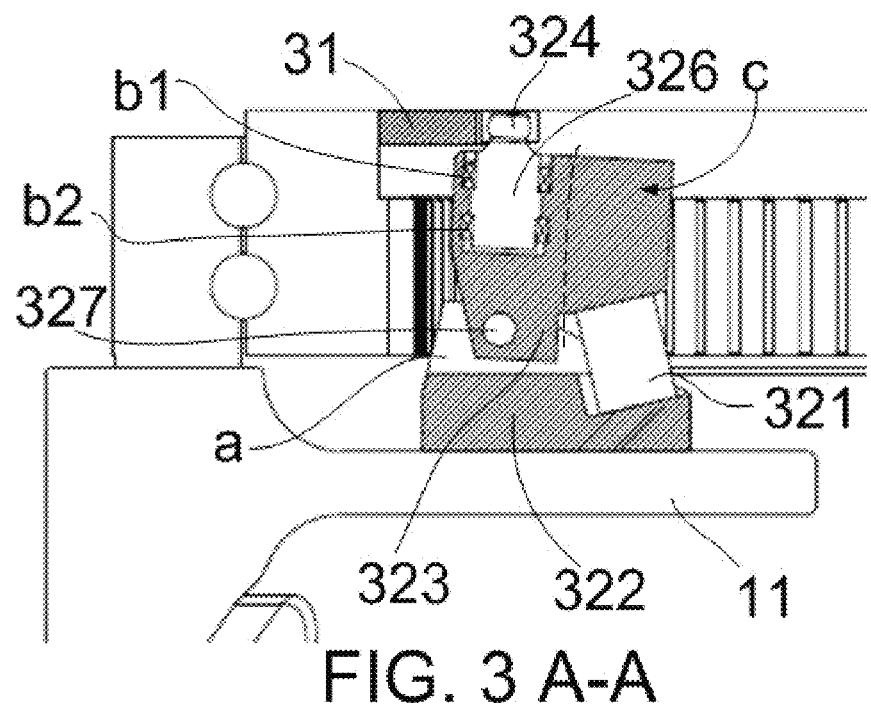
FIG. 3 A-A

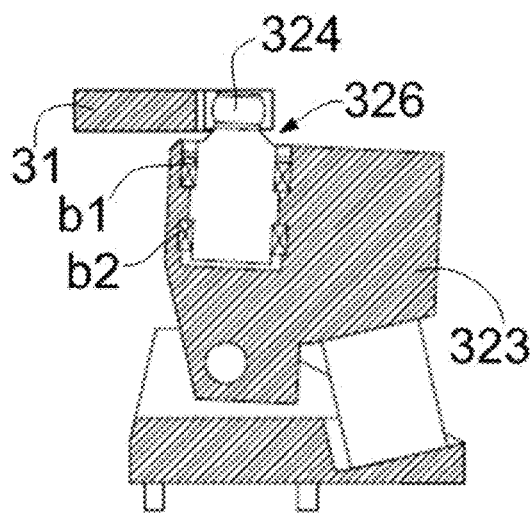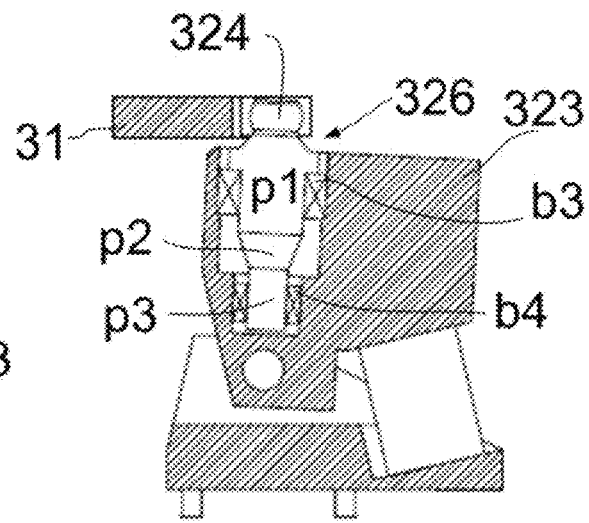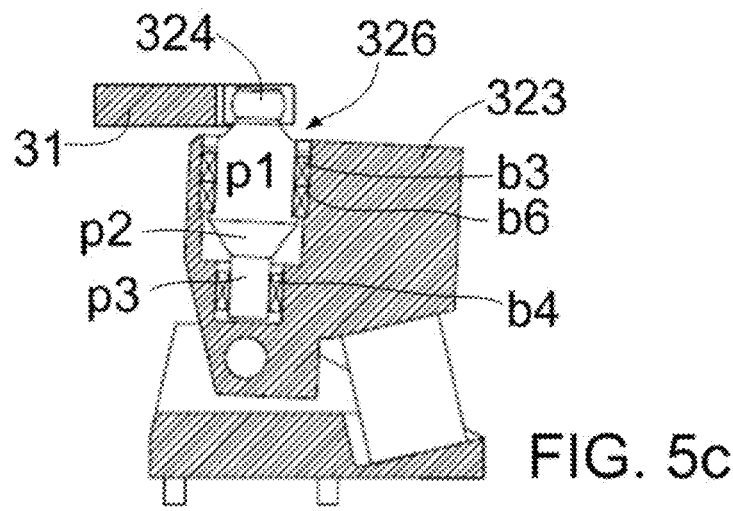

WIND TURBINE ROTOR AND METHOD OF ASSEMBLY THEREOF

This application claims the benefit of European Patent Application EP 11382237.3 filed on Jul. 13, 2011 and U.S. Provisional Patent Application Ser. No. 61/534,014 filed on Sep. 13, 2011.

The present invention relates to wind turbine rotors, and more particularly relates to wind turbine rotors comprising at least one pitch mechanism. The invention further relates to a method of assembling a pitch retention system in a wind turbine rotor.

BACKGROUND ART

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

Pitch systems are employed for adapting the position of a wind turbine blade to varying wind conditions. In this respect, it is known to rotate the position of a wind turbine blade along its longitudinal axis in such a way that it generates less lift (and drag) when the wind speed increases. In this way, even though the wind speed increases, the torque transmitted by the rotor to the generator remains substantially the same. It is furthermore also known to rotate wind turbine blades towards their stall position (so as to reduce the lift on the blades) when the wind speed increases. These wind turbines are sometimes referred to as "active-stall" wind turbines. Pitching may furthermore also be used for rotation of the blade towards its vane position, when a turbine is temporarily stopped or taken out of operation for e.g. maintenance.

Pitch systems generally comprise an electric or hydraulic motor which, through the use of reduction gearing (sometimes referred to as a "reductor", or as a "reduction gear"), drives an actuating gear. Said actuating gear (pinion) is generally arranged to mesh with an annular gear (crown) provided on the wind turbine blade to set the wind turbine blade into rotation. Other actuating mechanisms operated by a pitch motor are also known.

It is further known to provide an individual pitch system (comprising a separate motor and separate control) for each individual wind turbine blade of a rotor. It is also known to provide a common pitch system wherein the pitch angle of the blades is the same for all blades on a rotor. Such a common pitch system may comprise a single motor or may comprise a plurality of motors, one for each blade.

A control strategy of a pitch system that is often employed in variable speed wind turbines is to maintain the blade in a default pitch position at wind speeds equal to or below nominal wind speed (for example, approximately 4 m/s-15 m/s). Said default pitch position may generally be close to a 0° pitch angle. The exact pitch angle in or below nominal wind speed conditions depends however on the complete design of the wind turbine. Above the nominal wind speed (for example from approximately 15 m/s-25 m/s), the blades are rotated to maintain the aerodynamic torque delivered by the rotor substantially constant. When the wind turbine is not operating, the blades may assume a vane position (e.g. at or around 90° pitch angle) to minimize the loads on the blades. During most of the wind turbine's life, a blade may however be in the same pitch position which is that at or below nominal wind speed. The nominal wind speed, cut-in wind speed and cut-out wind speed may of course vary depending on the wind turbine design.

During operation of the wind turbine, forces may be acting on the blades that result in a constantly varying torque around the blade's longitudinal axis. These forces may include the aerodynamic torque around the longitudinal axis of the blade and also, since the blade's centre of mass is usually not located exactly on its rotating axis, the weight of the blade may exercise an additional torque around the blade's longitudinal axis. Both these forces are non-constant, largely cyclical and tend to rotate the blade out of the position determined by the pitch control system.

When a pitch system involving gearing is used, the varying torque may result in flanks of the teeth of the actuating gear (pinion) and annular gear (crown) repeatedly touching each other. Such repetitive contact between teeth removes thin metallic particles, and may create a tooth print in the contacting flanks of the crown and the pinion. This repetitive contact may thus lead to fretting corrosion and premature wear. Since the pitch position at or below nominal wind speed is the prevailing position for most wind turbines, the contact between the teeth and its consequences is usually concentrated on the same teeth.

In addition, commercially available electrically actuated brake calipers are generally not able to provide the required level of retention torque, thus the problem of the flanks of the teeth of the actuating gear (pinion) and annular gear (crown) repeatedly touching each other persists.

Some solutions for these problems are known. It is e.g. known to provide an automatic lubrication system to try and prevent fretting corrosion. For example, DE-202005014699U and EP1816346 provide such lubrication systems. These lubrication systems may help to reduce fretting corrosion to a smaller or larger extent, but do not combat or resolve the problem underlying the corrosion of the teeth flanks contacting each other.

Thus, there still exists a need to achieve blade retention when no pitching is required.

SUMMARY OF THE INVENTION

In a first aspect, a wind turbine rotor is provided that comprises a hub, a plurality of blades, at least one pitch system for rotating a blade substantially along its longitudinal axis and at least one pitch retention system. The pitch retention system may comprise a cam profile and a cam follower, wherein one of the hub and a blade comprises said cam profile and the other of the hub and blade comprises said cam follower. The cam follower may comprise a pushing member and a contact member, wherein the pushing member is arranged to push the contact member towards the cam profile. The cam profile may comprise a local depression. The cam follower and cam profile may be arranged such that when the blade is in a pitch position at or below nominal wind speed, the contact member can be retained in said local depression.

According to this aspect, when the blade is in a pitch position at or below nominal wind speed, the contact member is retained in the local depression of the cam profile. This system adds retention torque to ensure no relative movement or contact will occur between the annular gear (crown) and the driving pinion. Furthermore, the retention torque is substantially only provided at the pitch position at or below nominal wind speed, when the blade has to be kept in standstill position. Thus, the system does not hinder or negatively influence the normal operation of a pitch system when not in the pitch position at or below nominal wind speed.

The retention torque is generated by the pressure exerted by the pushing member on the contact member. The contact member is pushed towards the cam profile in such a manner that the cam follower moves along the cam profile (on inclined planes of the cam profile). Thus, a tangential component of such pushing force generates an additional retention torque. Such retention torque reduces repetitive contact between teeth flanks, thus reducing fretting corrosion and premature wear of the teeth.

In some embodiments the pushing member may be an elastic member that may be preloaded to compression when assembling. This way, an elastic force may act in order to return the elastic member to its natural length depending upon the shape of the cam profile. The elastic member may e.g. be a spring, a group of springs, or a bending bar.

In some embodiments, the cam follower may comprise a support and a rocker and the pushing member may be arranged between the support and the rocker. This way, a linear force generated by the pushing member may be converted substantially into a radial force with respect to the pitch bearing. The contact between the contact member of the cam follower and the local depression provided on the cam profile may thus generate a tangential force and a radial force which enhance the retention torque.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which:

FIG. 2 shows an enlarged view of FIG. 1;

FIG. 3 shows a cross-sectional view of FIG. 2 along line A-A;

FIGS. 5a-5c show three alternative embodiments of a cam follower;

DETAILED DESCRIPTION OF EMBODIMENTS

Figure 1:
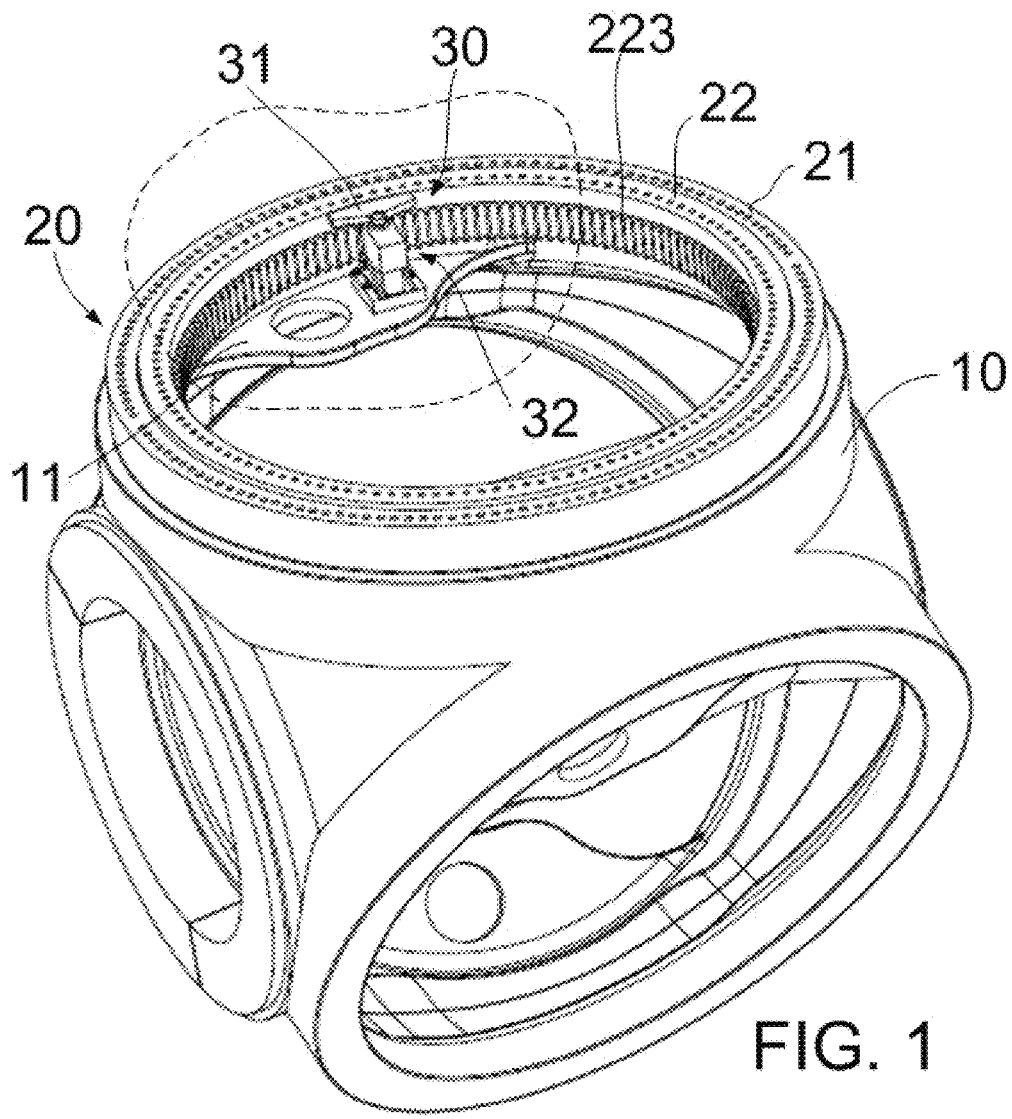
FIG. 1 shows a perspective of a wind turbine rotor according to a first embodiment.

FIG. 1 shows a wind turbine rotor that may comprise a hub 10 to which a plurality of blades (not shown) may be rotatably attached. A pitch mechanism (only partially shown) may be provided for rotating each blade along its longitudinal axis. The pitch mechanism may comprise a pitch bearing 20 between a blade and the hub 10. The pitch bearing 20 may comprise an outer bearing ring 21 connected with the hub 10 and an inner bearing ring 22 connected with a blade (not shown). The inner bearing ring 22 may be provided with an annular gear 223. The hub 10 may comprise a flange 11 for mounting a drive pinion of a drive motor (neither shown). In some embodiments, the flange may form an integral piece with the hub. In others it may be a separate piece fixed to the hub by welding or by fastening means such as screws, bolts or similar.

The pitch bearing 20 may further comprise a pitch retention system 30. The pitch retention system 30 may comprise a cam profile 31 and a cam follower 32.

As shown in FIG. 1, the cam profile 31 may be radially fixed to the inner bearing ring 22 and the cam follower 32 may be mounted on the flange 11.

In general, the cam follower may comprise a pushing member that may push a contact member towards the cam profile.

FIG. 2 shows an enlarged view of the area enclosed by the dashed line in FIG. 1.

In the embodiment shown in FIGS. 1 and 2, the pushing member may be an elastic member 321 which may be preloaded when assembling.

In alternative embodiments, the pushing member may be an actuator selected from the group consisting of electrical, hydraulic or pneumatic actuator. In these cases it is not necessary to preload it to compression when assembling. In these embodiments, the actuator may require a control system for appropriately activating the actuator.

As shown in FIG. 2, the cam follower may comprise a contact member in the form of a plain bearing 324 at one end. The plain bearing 324 may be in frictional contact with the cam profile 31 when the blade is in or near the pitch position at or below nominal wind speed. FIG. 2 shows the situation wherein the blade is in the pitch position at or below nominal wind speed and the plain bearing 324 may be retained in a local depression 311 provided on the cam profile 31. According to this embodiment, the cam profile 31 may be arranged in such a manner that the local depression 311 is radially oriented with respect to the pitch bearing. This way, radial movement of the bearing is avoided. In alternative embodiments, the cam profile may be arranged in such a manner that the local depression may be axially arranged with respect to the pitch bearing. In these cases, the axial forces pushing the contact member towards the cam profile may also add some retention torque. In some embodiments, the cam profile may be fixed to the bearing ring, e.g. through an adapter comprising a plurality of holes to facilitate its attachment with bolts or similar.

As shown in FIG. 2, the local depression 311 may be provided substantially in the middle point of the cam profile 31. Further, the local depression 311 may be flanked by to sloped planes 312. Thus, upon rotation of the pitch bearing, the contact member 324 of the cam follower may contact the cam profile 31 defining a radial displacement of the cam follower with respect to the inner bearing ring 22. The radial displacement may be maximum at the end of each sloped plane 312 of the cam profile 31, at the edges of the local depression 311. The inclination of the sloped planes 312 may ensure a smooth transition from a no radial displacement position (rest position) of the cam follower, i.e. when there is no compression in the case of an elastic pushing member, to a maximum radial displacement position of the cam follower.

In the embodiment shown in FIGS. 1 and 2, the elastic member 321 may be an elastomeric cylinder. In other embodiments, the elastic member may be selected from the group consisting of a polymer spring, a metal spring or a group of springs.

In the embodiment shown in FIGS. 1 and 2, the cam follower may further comprise a support 322 which may be fixed to the flange 11 provided on the hub. The cam follower may further comprise a rocker 323 that may tilt about a shaft 327 provided between two upward flanks a, b of the support 322. In these cases, the elastic member 321 may be arranged between a rear portion of the rocker 323 (distanced from the shaft 327) and the support 322.

Further, the plain bearing 324 provided on the cam follower may be mounted on a shaft (see also FIGS. 3 and 5a-5c, reference 326) that may be rotatably housed inside the rocker 323. The plain bearing 324 can thus rotate about this shaft upon relative movement between the blade and the hub.

In some cases, the support 322 may be bolted or screwed to the flange 11. In the embodiment shown in FIGS. 1 and 2, the support 322 may have a square base which may be bolted to the flange 11 using four bolts 325 (only three of them are visible).

FIG. 3 shows a cross-sectional view of FIG. 2 along line A-A. In FIG. 3 the elastic member 321 may be arranged between a rear portion (schematically indicated by arrow c defined by a dash line) of the rocker 323 (at a certain distance from the shaft 327) and the support 322. This way, the rocker 323 may transform the linear load exerted by the elastic member 321 into a radial pushing force on the plain bearing 324. Said radial pushing force may push the plain bearing 324 towards the cam profile 31. The amount of elastic force exerted by the elastic member 321 may depend on the shape of the cam profile 31. The plain bearing 324 may be mounted on a shaft 326 that may be rotatably housed inside the rocker 323 in order to ensure the rotation of the plain bearing 324. In the embodiment shown in FIG. 3 the shaft 326 may be a cylindrical shaft that may be mounted on two bearings b1, b2.

In alternative embodiments, the contact member may be a cylindrical member that may be mounted on the shaft through a ball bearing. In others, it may be a spherical member fixed to the shaft. In yet, further embodiments, the contact member may be a spherical surface directly machined in the shaft. In general, the contact members may be made of steel.

Figures 4A, 4B:
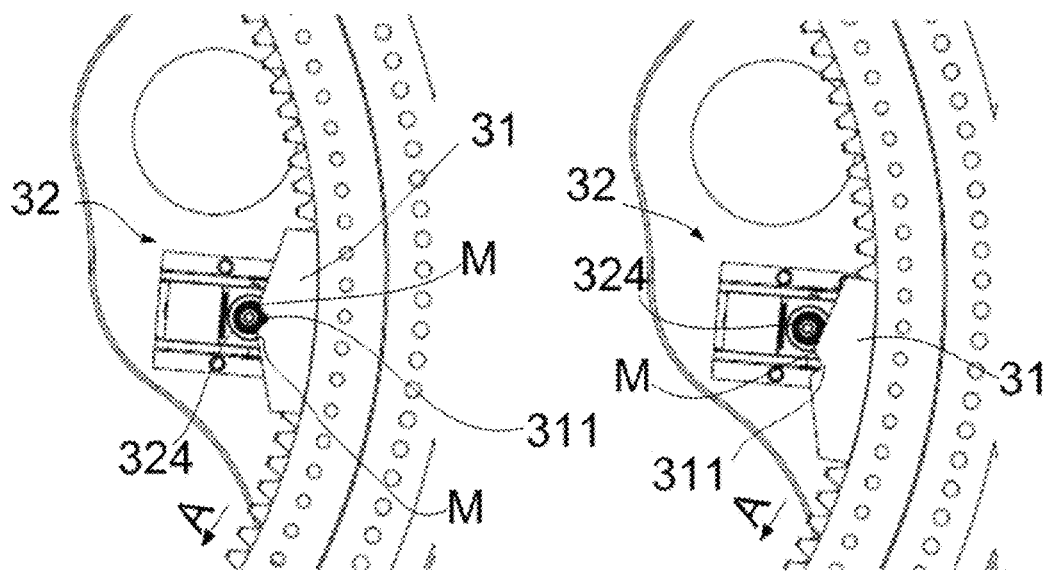
FIGS. 4a-4c show a sequence of three possible positions of the cam follower with respect to the cam profile.
Figure 4C:
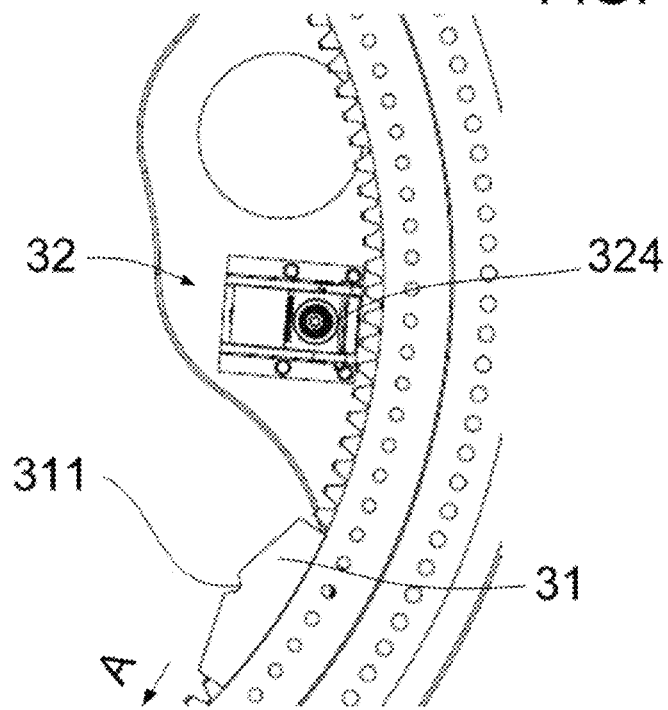

FIGS. 4a-4c show a sequence of three possible positions of the cam follower 32 with respect to the cam profile 31 when an inner bearing ring 22, connected to a blade (not shown), may be rotated in the direction of arrow A changing the blade's pitch position.

FIG. 4a shows a situation in which the blade may be in the pitch position at or below nominal wind speed. The plain bearing 324 of the cam follower 32 may be retained on the local depression 311 of the cam profile 31. The plain bearing 324 may thus be retained between the two points of maximum radial displacement M wherein the retention force is maximum (resulting from the addition of a radial force plus a tangential force).

FIG. 4b shows a situation in which the blade may be near the pitch position at or below nominal wind speed. This situation may correspond to a wind speed just above nominal wind speed. The plain bearing 324 of the cam follower 32 may be in frictional contact with one of the sloped planes 312 of the cam profile 31.

FIG. 4c shows a situation in which the blade may not be near the pitch position at or below nominal wind speed. This situation may correspond to a wind speed well above the nominal wind speed. The plain bearing 324 of the cam follower 32 may not be in contact with the cam profile 31 and an elastic pushing member of the cam follower may not be compressed.

It will be clear that e.g. the shape of the shaft and the number of bearings supporting it may be varied in accordance with, for example, bearings standard sizes and costs.

FIGS. 5a-5c show some possible embodiments for the shaft 326 and for mounting it inside the rocker 323 in order to ensure the rotation of the plain bearing 324 when being pushed towards the cam profile 31.

In FIG. 5a the shaft 326 may comprise a cylinder body mounted through two annular bearing b1, b2, one at each end of the cylinder body.

In FIG. 5b the shaft 326 may comprise a first cylinder portion p1 mounted through an annular bearing b3, a truncoconical portion p2 and second cylinder portion p3 mounted through a second annular bearing b4. The second cylinder portion p3 may have a narrower diameter than that of the first cylinder portion p1. The embodiment shown in FIG. 5c differs from that of FIG. 5b in that the first cylinder portion may be mounted through two annular bearings b3, b6.

In all cases the bearings b1-b6 may be e.g. plain or roller bearings.

Figure 6:
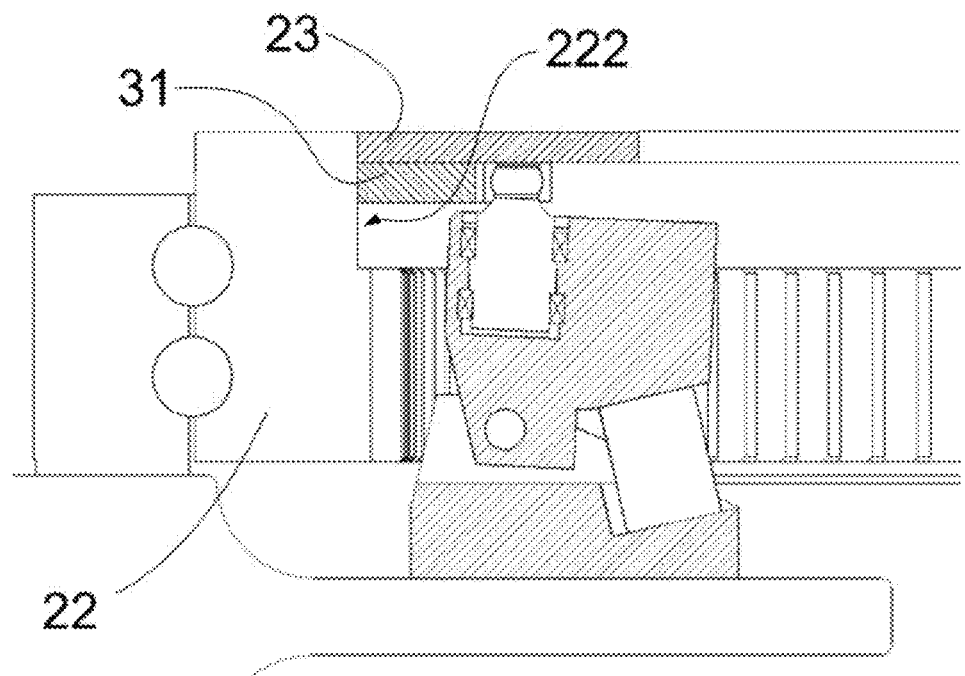
FIG. 6 shows a cross-sectional view of another embodiment.

FIG. 6 shows a cross-sectional view of a further embodiment which differs from the embodiment described in FIG. 3 in a reinforcement ring 23 that may be radially fixed to an inner side 222 of the inner bearing ring 22. In these cases, the cam profile 31 may be attached (e.g. screwed or glued or welded) to the reinforcement ring 23. Such a reinforcement ring 23 may absorb internal tensions and may transform them into a homogeneous tension distributed all through its surface. Thus, the reinforcement ring 23 may avoid deformation of the bearing.

Figure 7:
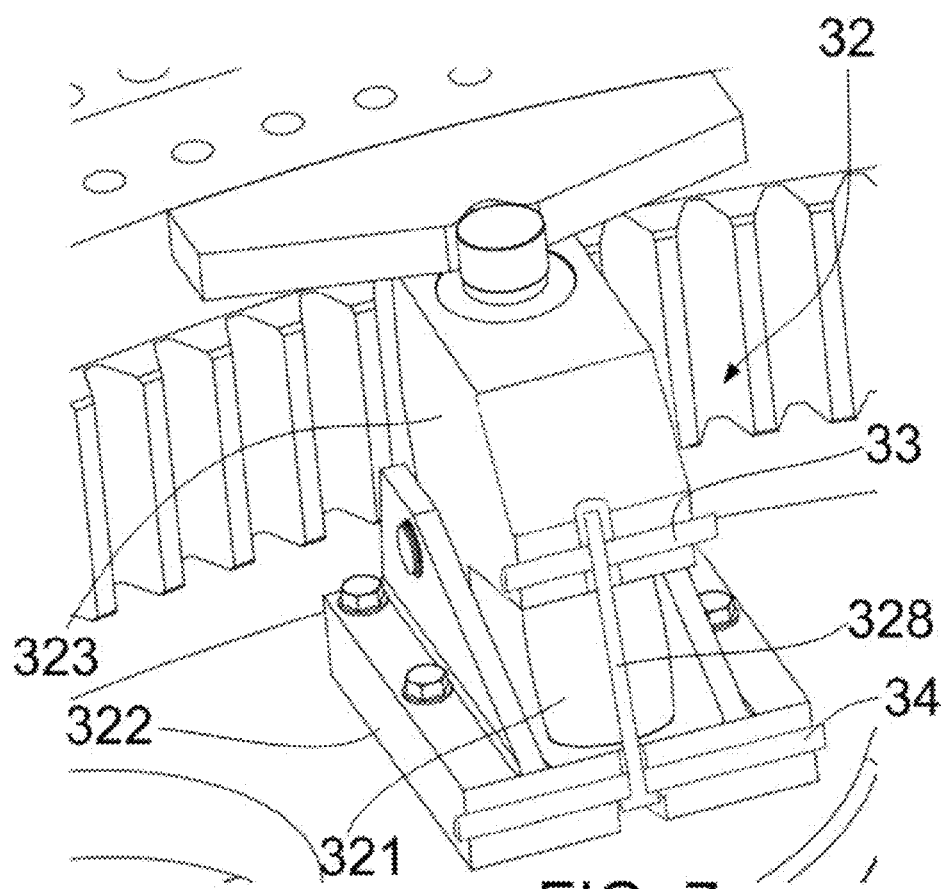
FIG. 7 shows yet a further embodiment.

FIG. 7 shows an embodiment of the cam follower 32 that may comprise a preloading bolt 328 arranged between the rocker 323 and the support 322. The preloading bolt 328 may be arranged between two shafts, a first floating shaft 33 comprising a threaded hole and mounted on the rocker 323 and a second floating shaft 34 comprising a hole and mounted on the support 322.

This way, the compression of the elastic pushing member 321 may be carried out by tightening the preloading bolt 328 between the two shafts 33, 34. Therefore, a pre-compression of the cam follower can be done before assembly. Said pre-compression can also be removed once mounted.

Figure 8:
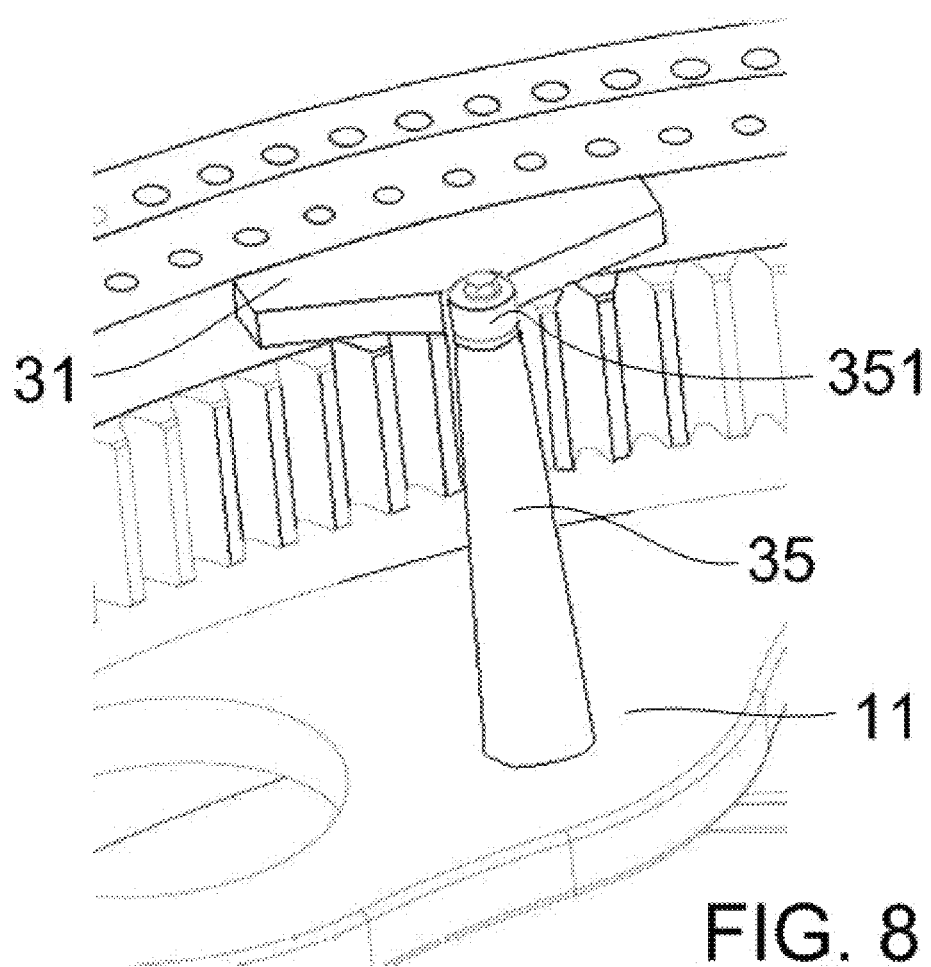
FIG. 8 shows an enlarged view of a further embodiment.

FIG. 8 shows an embodiment wherein the pushing member may be a bending bar 35 that may be preloaded to compression by torsion. The bending bar 35 may be mounted on the flange 11 provided on the hub. In some embodiments, the bending bar may be fixed to the flange via a yoke mechanism (not shown) this way the bending motion of the bending bar can be converted into a linear motion/force to be transmitted to the contact member. In this embodiment, the contact member may also be a plain bearing 351 mounted at the top of the bending bar 35. The plain bearing 351 may be in frictional contact with the cam profile 31 when the blade is in or near the pitch position at or below nominal wind speed. The plain bearing 351 may be mounted on the bending bar 35 by a shaft (not shown) rotatably housed inside the bending bar 35 and arranged substantially as hereinbefore described (see FIGS. 5a-5c) in order to ensure the rotation of the plain bearing 351 on the cam profile 31.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine rotor, comprising:
   a hub, a plurality of blades, at least one pitch system for rotating a blade substantially along its longitudinal axis, and at least one pitch retention system,
   the at least one pitch retention system comprising a cam profile and a cam follower, wherein
      one of the hub and the blade comprises the cam profile and the other of the hub and the blade comprises the cam follower,
      the cam follower comprises a pushing member and a contact member, wherein the pushing member is arranged to push the contact member towards the cam profile,
      the cam profile comprises a local depression, and
      the cam follower and cam profile are arranged such that when the blade is in a pitch position at or below nominal wind speed, the contact member can be retained in the local depression.

2. The wind turbine rotor of claim 1, wherein the contact member is a plain bearing that is in frictional contact with the cam profile when the blade is in or near the pitch position at or below nominal wind speed.

3. The wind turbine rotor of claim 1, wherein the pushing member is an elastic member that is preloaded in compression.

4. The wind turbine rotor of claim 3, wherein the elastic member is a bending bar.

5. The wind turbine rotor of claim 3, wherein the elastic member is selected from the group consisting of a polymer spring, a metal spring or a group of springs.

6. The wind turbine rotor of claim 1, wherein the cam follower comprises a support and a rocker and the pushing member is arranged between the support and the rocker.

7. The wind turbine rotor of claim 6, wherein the contact member is mounted on a shaft rotatably housed inside the rocker.

8. The wind turbine rotor of claim 6, wherein the cam follower further comprises a preloading bolt.

9. The wind turbine rotor of claim 8, wherein the preloading bolt is arranged between two shafts, a first floating shaft comprising a threaded hole and mounted on the rocker and a second floating shaft comprising a hole and mounted on the support in such a manner that when the bolt is adjusted, the pushing member can be compressed.

10. The wind turbine rotor of claim 1, wherein an inner pitch bearing ring comprises a reinforcement disc radially fixed to an inner side of the inner bearing ring and the cam profile is mounted on the reinforcement disc.

11. The wind turbine rotor of claim 10, wherein an outer diameter of the reinforcement disc is slightly bigger than an inner diameter of the inner bearing ring such that the reinforcement disc and the inner bearing ring are shrink-fitted together.

12. The wind turbine rotor of claim 1, wherein the cam profile is mounted on a pitch bearing ring or a reinforcement disc by an adapter.

13. The wind turbine rotor of claim 1, wherein the cam profile is arranged in such a manner that the local depression is radially oriented with respect to a pitch bearing rotational axis.

14. The wind turbine rotor of claim 1, wherein the cam profile is arranged in such a manner that the local depression is axially oriented with respect to a pitch bearing rotational axis.

15. A method of assembling the pitch retention system of claim 1 in the wind turbine rotor, the method comprising:
   placing a pitch bearing in a pitch position corresponding to the nominal or below nominal wind speed;
   fixing the cam profile to a pitch bearing ring or a reinforcement disc;
   preloading the pushing member into compression;
   placing the cam follower with the compressed pushing member in contact with the cam profile;
   fixing the cam follower to another pitch bearing ring; and
   removing the preload on the pushing member.

16. The method of claim 15, wherein the cam profile is fixed to the blade and the cam follower is fixed to the hub.

17. The method of claim 15, wherein the cam profile is fixed to hub and the cam follower is fixed to the blade.

* * * * *